(12) United States Patent
McCauley et al.

(10) Patent No.: US 8,106,117 B2
(45) Date of Patent: Jan. 31, 2012

(54) METHOD TO IMPROVE COLD FLOW RESISTANCE OF POLYMERS

(75) Inventors: Kevin M. McCauley, Coventry Township, OH (US); Terrence E. Hogan, Akron, OH (US); Zbyslaw R. Owczarczyk, Golden, CO (US); Amy M. Randall, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/535,911

(22) Filed: Aug. 5, 2009

(65) Prior Publication Data

US 2010/0036026 A1 Feb. 11, 2010

Related U.S. Application Data

(60) Provisional application No. 61/086,264, filed on Aug. 5, 2008, provisional application No. 61/086,287, filed on Aug. 5, 2008.

(51) Int. Cl.
*C08K 5/00* (2006.01)

(52) U.S. Cl. ........ 524/108; 524/174; 524/175; 524/183; 524/336; 524/387

(58) Field of Classification Search .................. 524/108, 524/174, 175, 183, 336, 387
See application file for complete search history.

(56) References Cited

U.S. PATENT DOCUMENTS

| | | | |
|---|---|---|---|
| 3,846,363 A * | 11/1974 | Ando et al. ............. 523/164 |
| 4,301,026 A | 11/1981 | Kondo et al. | |
| 4,429,140 A | 1/1984 | Murai et al. | |
| 4,906,706 A | 3/1990 | Hattori et al. | |
| 4,990,573 A | 2/1991 | Andreussi et al. | |
| 5,064,910 A | 11/1991 | Hattori et al. | |
| 5,106,999 A | 4/1992 | Gardlik et al. | |
| 5,268,439 A | 12/1993 | Hergenrother et al. | |
| 5,332,810 A | 7/1994 | Lawson et al. | |
| 5,567,784 A | 10/1996 | Wieder et al. | |
| 5,786,441 A | 7/1998 | Lawson et al. | |
| 5,844,050 A | 12/1998 | Fukahori et al. | |
| 6,025,450 A | 2/2000 | Lawson et al. | |
| 6,046,288 A | 4/2000 | Lawson et al. | |
| 6,080,835 A | 6/2000 | Lawson et al. | |
| 6,238,615 B1 | 5/2001 | Kobayashi et al. | |
| 6,248,312 B1 | 6/2001 | Franklin et al. | |
| 6,942,871 B2 | 9/2005 | Bruning et al. | |
| 6,977,281 B1 | 12/2005 | Ozawa et al. | |
| 6,992,147 B1 | 1/2006 | Ozawa et al. | |
| 7,094,820 B2 | 8/2006 | Zhao et al. | |
| 7,153,919 B2 | 12/2006 | Hogan et al. | |
| 7,199,202 B2 | 4/2007 | Minami et al. | |
| 7,294,680 B2 | 11/2007 | Sone et al. | |
| 7,335,715 B2 | 2/2008 | Iseki et al. | |
| 2002/0170642 A1* | 11/2002 | Westermann et al. ..... 152/209.5 |
| 2006/0004131 A1 | 1/2006 | Ozawa et al. | |
| 2006/0025539 A1 | 2/2006 | Ozawa et al. | |
| 2006/0030677 A1 | 2/2006 | Ozawa et al. | |
| 2006/0264589 A1 | 11/2006 | Yan | |
| 2006/0264590 A1 | 11/2006 | Hogan et al. | |
| 2006/0272760 A1 | 12/2006 | Teratani et al. | |
| 2007/0149717 A1 | 6/2007 | Luo et al. | |
| 2007/0249850 A1 | 10/2007 | Xie et al. | |
| 2007/0276122 A1 | 11/2007 | Luo et al. | |
| 2007/0299256 A1 | 12/2007 | Xie et al. | |
| 2008/0051552 A1 | 2/2008 | Luo et al. | |
| 2008/0146745 A1 | 6/2008 | Luo et al. | |

FOREIGN PATENT DOCUMENTS

| | | |
|---|---|---|
| DE | 33 21 713 A1 | 12/1984 |
| JP | 63-256635 A | 10/1988 |
| JP | 05-051406 A | 3/1993 |
| JP | 05-059103 A | 3/1993 |
| JP | 10-306113 A | 11/1998 |
| JP | 11-035633 A | 2/1999 |
| WO | WO 92/00301 A1 | 1/1992 |
| WO | WO 01/34658 A1 | 5/2001 |
| WO | WO 01/34659 A1 | 5/2001 |

OTHER PUBLICATIONS

Terrence, Hogan; European Search Report Application EP 09251929, Oct. 20, 2009.

\* cited by examiner

*Primary Examiner* — Peter D Mulcahy
(74) *Attorney, Agent, or Firm* — Meredith E. Hooker; Arthur Reginelli

(57) ABSTRACT

A method for reducing the cold flow of a polymeric composition of matter by introducing polymer with the combination or reaction product of (i) an acetal or ketal of an alditol and (ii) (a) a hydrocarbylated boric acid, (b) an organoaluminum compound, or (c) both a hydrocarbylated boric acid and an organoaluminum compound.

28 Claims, No Drawings

METHOD TO IMPROVE COLD FLOW RESISTANCE OF POLYMERS

PRIORITY CLAIM

This application claims the benefit of U.S. Provisional Application Nos. 61/086,264 and 61/086,287, both filed Aug. 5, 2008, which are incorporated herein by reference.

FIELD OF THE INVENTION

One or more embodiments of the present invention relate to methods for reducing the cold flow of polymers.

BACKGROUND OF THE INVENTION

Certain polymers, such as linear polydienes, exhibit cold flow at standard conditions. In other words, the polymers flow under their own weight, which causes problems when attempting to transport or store the polymers. Therefore, it is desirable to prevent cold flow from occurring by improving cold flow resistance of the polymer.

One solution employed in the art includes coupling the polymers. For example, linear polydienes, such as those polydienes produced by anionic polymerization or coordination catalysis, have been coupled with coupling agents. Although coupling agents may serve to improve cold flow resistance, they do not always serve to provide desired tire properties.

For example, in the art of making tires, particularly tire treads, functionalized polymers are advantageously employed to improve properties such as reduction in hysteresis loss. These functionalized polymers are often prepared by terminating living polymer chains with functionalizing agents that impart a functional group on the end of the polymer chain. These functional groups are believed to interact with filler particles in the rubber composition and thereby impart the desired reduction in hysteresis loss.

Unfortunately, the functionalizing agents employed to terminate the polymer and provide advantageous properties to the tire do not always serve to provide cold flow resistance to the polymer. Furthermore, the use of coupling agents limits the amount of chain end functionalizing agents that may be incorporated for improved tire properties.

Because functionalized polymers are desired, and in fact there is a desire for functionalized polymers with a high degree of functionality, the use of coupling agents that compete with the functionalizing agent can be detrimental to this goal. A need therefore exists to improve cold flow resistance by means other than coupling reactions.

SUMMARY OF THE INVENTION

One or more embodiments of the present invention provide a method for reducing the cold flow of a polymeric composition of matter, the method comprising introducing a polymer with the combination or reaction product of (i) acetals or ketals of alditols and (ii) (a) hydrocarbylated boric acid, (b) an organoaluminum compound, or (c) both hydrocarbylated boric acid and an organoaluminum compound.

Other embodiments provide a polymer cement including the combination or reaction product of (i) acetals or ketals of alditols and (ii) (a) hydrocarbylated boric acid, (b) an organoaluminum compound, or (c) both hydrocarbylated boric acid and an organoaluminum compound.

Still other embodiments provide a composition of matter comprising a polymer and the combination or reaction product of (i) acetals or ketals of alditols and (ii) (a) hydrocarbylated boric acid, (b) an organoaluminum compound, or (c) both hydrocarbylated boric acid and an organoaluminum compound.

Other embodiments provide a method comprising introducing a hydrocarbylated boric acid with acetals or ketals of alditols to form a reaction product; introducing the reaction product to a polymer cement; and isolating solids from the polymer cement.

Still other embodiments provide a method comprising introducing an organoaluminum compound with acetals or ketals of alditols to form a reaction product; introducing the reaction product to a polymer cement; and isolating solids from the polymer cement.

Other embodiments provide a composition of matter comprising a polymer and hydrocarbyl boronic acid sorbitol ester or hydrocarbyl boronic acid xylitol ester.

DETAILED DESCRIPTION OF ILLUSTRATIVE EMBODIMENTS

According to one or more embodiments of the present invention, the combination or reaction product of (i) acetals or ketals of alditols and (ii)(a) a hydrocarbylated boric acid is introduced with a polymer. In other embodiments, the combination or complex of (i) acetals or ketals of alditols and (ii) (b) an organoaluminum compound is introduced with a polymer. In these or other embodiments, the combination or reaction product of (i) acetals or ketals of alditols and both (ii) (a) a hydrocarbylated boric acid and (ii) (b) an organoaluminum compound is introduced with a polymer. It has advantageously been discovered that the cold flow associated with the polymer can be reduced by these methods. Moreover, it has unexpectedly been discovered that the cold flow associated with the polymer introduced with the combination or reaction product of (i) acetals or ketals of alditols and (ii) (a) a hydrocarbylated boric acid can be reduced even when the polymer has been exposed to relatively high concentrations of water, such as typically occurs when the polymer is subjected to steam desolventization. Additionally, it has unexpectedly been discovered that the introduction of the complex of (i) acetals or ketals of alditols and (ii)(b) an organoaluminum compound is soluble in a variety of solvents including aliphatic and cycloaliphatic solvents, and therefore this technique can be advantageously used in a variety of processes.

Acetals or Ketals of Alditols

In one or more embodiments, acetals or ketals of alditols include mono, di-, and tri- acetals or ketals of alditols. In these or other embodiments, acetals or ketals of alditols include the reaction product of an alditol and an aldehyde, a ketone, or both an aldehyde and a ketone. These reactions are known in the art. For example, alditols and aldehydes can be reacted in the presence of an acid catalyst as described in U.S. Pat. Nos. 4,429,140 and 5,106,999, U.S. Publication Nos. 2007/0299256 and 2007/0249850, and International Application No. WO/1992/000301, all of which are incorporated herein by reference. And, for example, ketals of alditols can be prepared by reacting alditols with dimethoxy alkanes as taught in Smith, Michael B.; March, Jerry; *March's Advanced Organic Chemistry*, 5th Ed.; John Wiley & Sons, Inc: New York, 2001.

In one or more embodiments, alditols, which may also be referred to as substituted or unsubstituted alditols, include compounds defined by the formula:

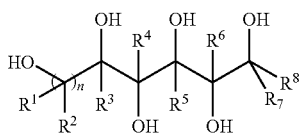

where $R^1$, $R^2$, $R^3$, $R^4$, $R^5$, $R^6$, $R^7$ and $R^8$ are each independently a hydrogen atom or monovalent organic group, and n is 0, 1, or 2.

In one or more embodiments, monovalent organic groups may include hydrocarbyl groups or substituted hydrocarbyl groups such as, but not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In particular embodiments, $R^2$, $R^3$, $R^4$, $R^5$, $R^6$ and $R^8$ are each independently a hydrogen atom or a monovalent organic group having 2 or less carbon atoms, and $R^1$ and $R^7$ are each independently a hydrogen atom or a monovalent organic group. In particular embodiments, $R^1$ and $R^7$ are each independently a hydrogen atom, an alkenyl group, an alkyl group, an alkoxy group, a hydroxyl alkyl group, or an alkyl-halide group.

Specific examples of alditols include, but are not limited to, sorbitol, xylitol, allyl-sorbitol, propyl-sorbitol, 1-methyl-2-propenyl sorbitol, allyl-xylitol, and propyl-xylitol.

In one or more embodiments, aldehydes include compounds represented by the formula $R^9$—C(O)H, where $R^9$ is a monovalent organic group. In particular embodiments, $R^9$ is an acyclic hydrocarbyl or substituted hydrocarbyl group having at least three carbon atoms, in other embodiments at least six carbon atoms, and in other embodiments at least nine carbon atoms up to 20 carbon atoms, where the term substituted refers to the replacement of one or more hydrogen atoms that are attached to a carbon atom with a monovalent organic group. In other embodiments, $R^9$ is a cyclic hydrocarbyl or substituted cyclic hydrocarbyl group including six carbon atoms, in other embodiments at least eight carbon atoms, and in other embodiments at least 10 carbon atoms in the ring. In certain embodiments, $R^9$ is a heterocyclic or substituted heterocyclic group. In yet other embodiments, $R^9$ is an aromatic or substituted aromatic group. In still other embodiments, $R^9$ is a heteroaromatic or substituted heteroaromatic group.

Examples of aldehydes include, but are not limited to, formaldehyde, acetaldehyde, propanal, butanal, pentanal, hexanal, heptanal, octanal, nonanal, decanal, dodecanal, cyclohexanecarboxaldehyde, cycloheptanecarboxaldehyde, cyclooctanecarboxaldehyde, cyclodecanecarboxaldehyde, cyclododecanecarboxaldehyde, benzaldehyde, 2-methoxybenzaldehyde, 4-diethylaminobenzaldehyde, trans-cinnamaldehyde, and mixtures thereof.

In particular embodiments, the aldehyde is a benzaldehyde or substituted benzaldehyde, which may be represented by the formula:

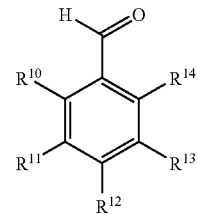

where $R^{10}$, $R^{11}$, $R^{12}$, $R^{13}$, and $R^{14}$ are each independently a hydrogen atom or a monovalent organic group, or where two or more of $R^{10}$, $R^{11}$, $R^{12}$, $R^{13}$, and $R^{14}$ join to form a divalent organic group.

In one or more embodiments, divalent organic groups may include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. The divalent organic groups may also contain one or more heteroatoms such as, but not limited to, nitrogen, oxygen, boron, silicon, sulfur, and phosphorus atoms.

Examples of substituted benzaldehydes include, but are not limited to, 4-ethylbenzaldehyde, 4-isobutylbenzaldehyde, 4-fluoro-3-methylbenzaldehyde, 3-methylbenzaldehyde, 4-propylbenzaldehyde, 4-butylbenzaldehyde, 4-methoxybenzaldehyde, 3-chlorobenzaldehyde, 3,4-dimethylbenzaldehyde, 3,5-difluorobenzaldehyde, 3-fluorobenzaldehyde, 4-fluorobenzaldehyde, 3-bromo-4-fluorobenzaldehyde, 3-methyl-4-methoxybenzaldehyde, 2,4,5-trimethylbenzaldehyde, 4-chloro-3-fluorobenzaldehyde, 4-methylbenzaldehyde, 3-bromobenzaldehyde, 4-methoxybenzaldehyde, 3,4-dichlorobenzaldehyde, 4-fluoro-3,5-dimethylbenzaldehyde, 2,4-dimethylbenzaldehyde, 4-bromobenzaldehyde, 3-ethoxybenzaldehyde, 4-allyloxybenzaldehyde, 3,5-dimethylbenzaldehyde, 4-chlorobenzaldehyde, 3-methoxybenzaldehyde, 4-(trifluoromethyl)benzaldehyde, 2-naphthaldehyde, 4-isopropylbenzaldehyde, 3,4-diethoxybenzaldehyde, 3-bromo-4-ethoxybenzaldehyde, piperonal, 3,4-dimethoxybenzaldehyde, 4-carboxybenzaldehyde, 3-hex-1-ynylbenzaldehyde, and 2-chlorobenzaldehyde.

In one or more embodiments, ketones include compounds represented by the formula $R^9$—C(O)—$R^{15}$, where $R^{15}$ and $R^9$ are each independently a monovalent organic group, or where $R^{15}$ and $R^9$ join to form a divalent organic group. In particular embodiments, at least one of $R^{15}$ and $R^9$ is an acyclic hydrocarbyl or substituted hydrocarbyl group having at least three carbon atoms, in other embodiments at least six carbon atoms, and in other embodiments at least nine carbon atoms up to 20 carbon atoms, where the term substituted refers to the replacement of one or more hydrogen atoms that are attached to a carbon atom with a monovalent organic group. In other embodiments, at least one of $R^{15}$ and $R^9$ is a cyclic hydrocarbyl or substituted cyclic hydrocarbyl group including six carbon atoms, in other embodiments at least eight carbon atoms, and in other embodiments at least 10 carbon atoms in the ring. In certain embodiments, at least one of $R^{15}$ and $R^9$ is a heterocyclic or substituted heterocyclic group. In yet other embodiments, at least one of $R^{15}$ and $R^9$ is an aromatic or substituted aromatic group. In still other embodiments, at least one of $R^{15}$ and $R^9$ is a heteroaromatic or substituted heteroaromatic group.

Examples of ketones include, but are not limited to, acetone, propanone, 2-butanone, 2-pentanone, 3-pentanone, 2-hexanone, 3-hexanone, 2-heptanone, 4-heptanone, 2-octanone, 4-octanone, 2-nonanone, 3-nonanone, 5-nonanone, 2-decanone, 5-decanone, acetophenone, benzophenone, 4,4'-bis(diethylamino)benzophenone, cyclobutanone, cyclohexanone, cycloheptanone, cyclooctanone, cyclododecanone, and mixtures thereof.

In one or more embodiments, acetals or ketals of alditols may be defined by the formula:

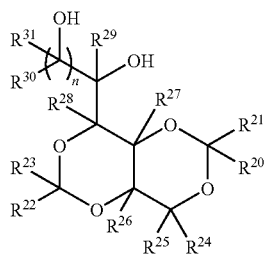

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2. In particular embodiments, $R^{20}$ and $R^{22}$ are monovalent organic group and $R^{21}$ and $R^{23}$ are hydrogen atoms. In these or other embodiments, $R^{25}$ is a monovalent organic group and $R^{24}$, $R^{26}$, $R^{27}$, $R^{28}$, $R^{29}$, $R^{30}$, and $R^{31}$ are hydrogen atoms.

In one or more embodiments, $R^{20}$ and $R^{22}$ are aromatic groups, and particular embodiments may be defined by the formula:

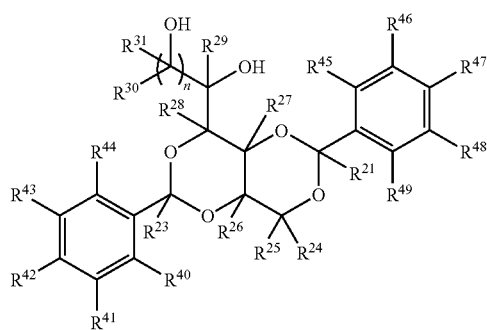

where $R^{21}$, $R^{23}$, $R^{24}$, $R^{25}$, $R^{26}$, $R^{27}$, $R^{28}$, $R^{29}$, $R^{30}$, $R^{31}$, $R^{40}$, $R^{41}$, $R^{42}$, $R^{43}$, $R^{44}$, $R^{45}$, $R^{46}$, $R^{47}$, $R^{48}$ and $R^{49}$ are each independently a hydrogen atom or a monovalent organic group, or where two or more of $R^{40}$, $R^{41}$, $R^{42}$, $R^{43}$, $R^{44}$, $R^{45}$, $R^{46}$, $R^{47}$, $R^{48}$ and $R^{49}$ join to form a divalent organic group, and where n is 0, 1, or 2.

In one or more embodiments, examples of acetals of alditols include dimethylidene sorbitol, dibenzylidene sorbitol (DBS), di(alkylbenzylidene) sorbitols, 1,3-O-2,4-bis(3,4-dimethylbenzylidene)sorbitol, 1,3,2,4-bis(4-ethylbenzylidene)-1-allyl-sorbitol, 1,3,2,4-bis(3'-methyl-4'-fluorobenzylidene)-1-propyl-sorbitol, 1,3,2,4-bis(5',6',7',8'-tetrahydro-2-naphthaldehydebenzylidene)-1-allyl-xylitol, bis-1,3,2,4-(3',4'-dimethylbenzylidene)-1''-methyl-2''-propyl-sorbitol, and 1,3,2,4-bis(3',4'-dimethylbenzylidene)-1-propyl-xylitol. These compounds may be collectively referred to as sorbitols or xylitols.

As is known in the art, dibenzylidene sorbitol is commonly derived from d-sorbitol. Less commonly, dibenzylidene sorbitol can be derived from 1-sorbitol or from a random sorbitol. Practice of this invention is not limited by the selection of any particular stereoisomer of the acetals or ketals of alditols such as dibenzylidene sorbitol. And, unless specifically stated, reference to an acetal or ketal of an alditol, for example dibenzylidene sorbitol (DBS), will include all stereoisomers (e.g. those that derivatives of d-sorbitol, 1-sorbitol, or random sorbitol).

Inasmuch as dibenzylidene sorbitol (DBS) is commercially available, and for ease of illustration in this specification, specific embodiments may be described with respect to DBS, although it should be understood that these embodiments are equally applicable to other acetals or ketals of alditols.

Hydrocarbylated Boric Acid

Hydrocarbylated boric acids include those compounds where a hydroxyl group of boric acid is substituted or replaced by a hydrocarbyl group. In one or more embodiments, hydrocarbylated boric acids include boronic acids and/or borinic acids.

In one or more embodiments, the boronic acids can be defined by the formula:

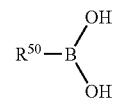

where $R^{50}$ is a hydrocarbyl group.

In one or more embodiments, hydrocarbyl groups include, but not limited to, alkyl, cycloalkyl, alkenyl, cycloalkenyl, aryl, allyl, aralkyl, alkaryl, and alkynyl groups. Hydrocarbyl groups also include substituted versions of these groups where one or more hydrogen atoms within the group are replaced by a hydrocarbyl group (e.g. alkyl group). These hydrocarbyl groups can contain from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. In particular embodiments, the hydrocarbyl group includes at least 3, in other embodiments at least 5, in other embodiments at least 10, in other embodiments at least 12 carbon atoms, and in other embodiments from about 3 to 50 carbon atoms. In certain embodiments, the hydrocarbyl group is a branched group or a bulky or highly branched group.

As those skilled in the art appreciate, boronic acids are commercially available. Also, useful boronic acids can be synthesized by employing known techniques. For example, a borate ester can be reacted with a hydrocarbylmagnesium bromide or chloride in anhydrous tetrahydrofuran (THF) followed by the addition of acidic water (pH=4) to precipitate the reaction product.

In one or more embodiments, borinic acids may be defined by the formula:

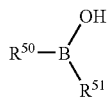

where $R^{50}$ and $R^{51}$ are the same or different hydrocarbyl group.

Reaction Product with Hydrocarbylated Boric Acid

In one or more embodiments, the product resulting from introducing an acetal or ketal of an alditol with a hydrocarbylated boric acid is not understood with certainty. The term reaction product will therefore be employed to refer to simple mixtures of the acetal or ketal of an alditol and the hydrocarbylated boric acid, complexes of the acetal or ketal of an alditol and the hydrocarbylated boric acid, and actual reaction products between the acetal or ketal of an alditol and the hydrocarbylated boric acid. In one or more embodiments, particularly where boronic acid is reacted with a sorbitol (e.g. dibenzylidene sorbitol), it is believed that the reaction product is a hydrocarbyl boronic acid sorbitol ester, or where boronic acid is reacted with xylitol, it is believed that the reaction product is a hydrocarbyl boronic acid xylitol ester.

For example, hydrocarbyl boronic acid esters (e.g. hydrocarbyl boronic acid sorbitol ester) according to one or more embodiments of the present invention may be defined by the formula:

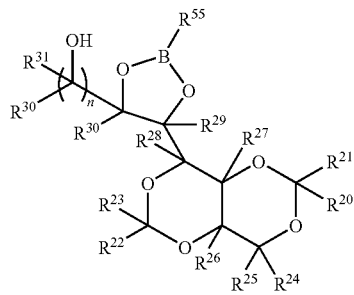

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2, as defined above, and $R^{55}$ is a hydrocarbyl group.

For example, hydrocarbyl borinic acid esters (e.g. hydrocarbyl borinic acid sorbitol ester) according to one or more embodiments of the present invention may be defined by one of the formulae:

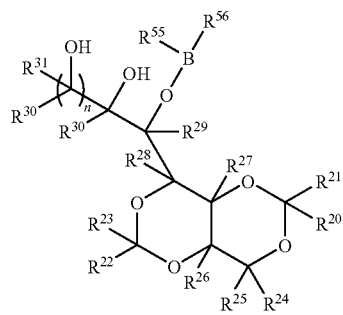

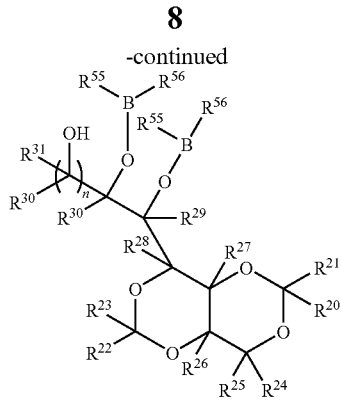

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2, as defined above, and $R^{55}$ $R^{56}$ are each independently a hydrocarbyl group.

The acetal or ketal of an alditol (e.g. DBS) and the hydrocarbylated boric acid (e.g. boronic acid) can be introduced within a solvent, such as aromatic or heteroatom-containing solvents. Examples of aromatic solvents include but are not limited to benzene, bromobenzene, chlorobenzene, nitrobenzene, pyridine, toluene, ethylbenzene, benzonitrile, naphthalene, quinoline, o-xylene, m-xylene, p-xylene, ethyl benzene, diethyl benzene, anisole, and mesitylene. Examples of heteroatom-containing solvents include but are not limited to tetrahydrofuran, methylene chloride, chloroform, carbon tetrachloride, diethyl ether, dimethylsulfoxide, 1,3-dioxane, 1,4-dioxane, ethyl acetate, acetone, and dimethylforamide.

The acetal or ketal of an alditol (e.g. DBS) and the hydrocarbylated boric acid (e.g. boronic acid) can be introduced and allowed to react under conditions that form the reaction product. For example, DBS and the boronic acid can be refluxed in the presence of an aromatic solvent with the removal of water at temperatures in excess of 100 degree Celsius (e.g., toluene; boiling point of 110° C.) under atmospheric pressure.

The acetal or ketal of an alditol (e.g. DBS) and the hydrocarbylated boric acid (e.g. boronic acid) can be introduced at a hydrocarbylated boric acid to acetal or ketal of an alditol molar ratio of at least 0.2:1, in other embodiments at least 0.5:1, and in other embodiments at least 1:1. In these or other embodiments, the molar ratio of the hydrocarbylated boric acid to the acetal or ketal of an alditol is less than 5:1, in other embodiments less than 3:1, and in other embodiments less than 2:1. In particular embodiments, about 2 moles of hydrocarbylated boric acid (e.g. boronic acid) is introduced to about 1 mole of acetal or ketal of an alditol (e.g. DBS).

In one or more embodiments, the reaction product formed from the hydrocarbylated boric acid and the acetal or ketal of an alditol can be isolated as a solid. Known methods such as vacuum desolventization can be employed to isolate the reaction product.

In one or more embodiments, the reaction product can be dissolved in a desirable solvent to form a solution of the product. In certain embodiments, these solvents include aromatic and heteroatom-containing solvents, such as those described above. This solution can be tailored to a desirable concentration for introduction to the polymer. In one or more embodiments, the solution of the reaction product in the solvent may be at least 0.5%, in other embodiments at least 1%, and in other embodiments at least 2% by weight reaction product in solution. In these or other embodiments, the solution of the reaction product in solvent may be less than 5%, in other embodiments less than 4%, and in other embodiments less than 3% by weight reaction product in solution.

Organoaluminum Compounds

The term "organoaluminum compound" may refer to any aluminum compound containing at least one aluminum-carbon bond. In one or more embodiments, organoaluminum compounds may be soluble in a hydrocarbon solvent. In one or more embodiments, organoaluminum compounds include those represented by the formula $AlR_nX_{3-n}$, where each R, which may be the same or different, is a monovalent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, monovalent organic groups may include hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms.

Types of organoaluminum compounds represented by the formula $AlR_nX_{3-n}$ include trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-totylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydride compounds include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum halide compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dihalide compounds include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds represented by the formula $AlR_nX_{3-n}$ include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds include aluminoxanes. Aluminoxanes include oligomeric linear aluminoxanes that can be represented by the general formula:

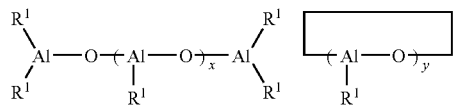

and oligomeric cyclic aluminoxanes that can be represented by the general formula: where x may be an integer of 1 to about 100, and in other embodiments about 10 to about 50; y may be an integer of 2 to about 100, and in other embodiments about 3 to about 20; and where each $R^1$, which may be the same or different, may be a monovalent organic group that is attached to the aluminum atom via a carbon atom. Monovalent organic groups are defined above. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, and 2,6-dimethylphenylaluminoxane. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$) such as diisobutyl aluminum hydride are employed in combination.

Reaction Product with Organoaluminum

In one or more embodiments, the product resulting from the introduction of an acetal or ketal of an alditol with an organoaluminum compound is not understood with certainty. The term reaction product will therefore be employed to refer to simple mixtures of the acetal or ketal of an alditol and the organoaluminum compound, complexes of the acetal or ketal of an alditol and the organoaluminum compound, and actual reaction products between the acetal or ketal of an alditol and the organoaluminum compound.

The acetal or ketal of an alditol (e.g. DBS) and the organoaluminum compound can be introduced within or in the presence of a solvent. Useful solvents include aromatic solvents, heteroatom-containing solvents, and non-aromatic non-heteroatom-containing solvents. Useful non-aromatic non-heteroatom-containing solvents include aliphatic solvents and cycloaliphatic solvents. Examples of aliphatic solvents include n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof. Examples of cycloaliphatic solvents include cyclopentane, cyclohexane, methylcyclopentane, methyl cyclohexane, and the like. Examples of aromatic solvents and heteroatom-containing solvents have been given above.

The acetal or ketal of an alditol (e.g. DBS) and the organoaluminum compound can be introduced and allowed to react or combine under conditions that form the complex. For example, DBS and the organoaluminum compound can be combined at temperatures below 0° C. under atmospheric pressure.

The acetal or ketal of an alditol (e.g. DBS) and the organoaluminum compound can be introduced at an organoaluminum compound to acetal or ketal of an alditol molar ratio of at least 3:1, in other embodiments at least 3.5:1, and in other embodiments at least 4:1. In these or other embodiments, the molar ratio of the organoaluminum compound to the acetal or ketal of an alditol is less than 100:1, in other embodiments less than 20:1, and in other embodiments less than 5:1. In particular embodiments, about 3 moles of organoaluminum compound is introduced to about 1 mole of acetal or ketal of an alditol (e.g. DBS).

In one or more embodiments, the complex is soluble in a solvent that the acetal or ketal of an alditol (e.g. DBS) and the organoaluminum compound are combined in the presence of. Alternatively, a solvent in which the complex is soluble is subsequently added to the complex. In either event, a solution of the complex in solvent is formed. This solution can be tailored to a desirable concentration for introduction to the polymer. In one or more embodiments, the concentration of the complex in the solvent may be at least 0.1 molar, in other embodiments at least 1 molar, and in other embodiments at least 2 molar. In these or other embodiments, the concentration of the complex in solvent may be less than 10 molar, in other embodiments less than 8 molar, and in other embodiments less than 5 molar.

Polymers to be Treated

In one or more embodiments, the polymers that are introduced with, which may also be referred to as treated with, the reaction product of (i) acetals or ketals of alditols and (ii) (a) a hydrocarbylated boric acid or (ii) (b) an organoaluminum compound according to this invention include those polymers exhibiting low resistance to cold flow. For example, included among these polymers are those that present technological difficulties during storage and transport.

In one or more embodiments, these polymers may be characterized by a disadvantageous cold flow as determined by employing standard cold flow measurements. These tests are well known to those skilled in the art. For example, standard gravitational cold flow may generally be determined according to the following method. A sample of the polymer to be tested is formed into a cylindrical shape having a diameter of about 10 mm and a height of about 13 mm. The cylinder is placed on one of its circular bases and left in place for 25 days; after which time the height of the cylinder is measured. As is also known, similar tests can be performed in an accelerated manner using a Scott Tester. For example, a similar 40 mm×13 mm cylinder can be placed on one of its cylindrical bases and a weight, such as a 5000 gram weight, can be place on top of the cylinder, and the sample is left in place for 30 minutes; after which time the height of the cylinder is measure.

In one or more embodiments, polymers that are treated according to one or more embodiments of this invention include those polymers whose 13 mm cylindrical samples, after standard gravitational cold flow analysis, have a height of less than 7 mm, in other embodiments less than 9 mm, in other embodiments less than 10 mm, in other embodiments less than 11 mm, and in other embodiments less than 12 mm.

In these or other embodiments, polymers that are treated according to one or more embodiments of this invention include those polymers whose 40 mm×13 mm cylindrical samples, after accelerated gravitational cold flow analysis using a Scott Tester, have a height of less than 7 mm, in other embodiments less than 9 mm, in other embodiments less than 10 mm, in other embodiments less than 11 mm, and in other embodiments less than 12 mm.

In one or more embodiments, the polymers that are treated according to one or more embodiments this invention include elastomers, which are polymers that are capable of being vulcanized to form vulcanizates exhibiting elastomeric properties. In one or more embodiments, the elastomers are unsaturated. In one or more embodiments, the elastomers have a glass transition temperature (Tg) of less than 20° C., in other embodiments less than 10° C., in other embodiments less than 0° C., in other embodiments less than −10° C., in other embodiments less than −20° C., and in other embodiments less than −30° C..

In one or more embodiments, the polymers treated according to one or more embodiments of this invention include linear molecules. In other embodiments, the polymers are substantially linear or only include limited branching.

In one or more embodiments, the polymers treated according to one or more embodiments of this invention include natural and/or synthetic elastomers. The synthetic elastomers may derive from the polymerization of conjugated diene monomers. These conjugated diene monomers may be copolymerized with other monomers such as vinyl aromatic monomers. Other rubbery elastomers may derive from the polymerization of ethylene together with one or more $\alpha$-olefins and optionally one or more diene monomers.

Examples of synthetic polymers include polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star shaped.

In one or more embodiments, useful elastomers may have a number average molecular weight (Mn) of less than 500 kg/mol, in other embodiments less than 400 kg/mol, in other embodiments less than 300 kg/mol, in other embodiments less than 250 kg/mol, in other embodiments less than 200 kg/mol, in other embodiments less than 150 kg/mol, and in other embodiments less than 125 kg/mol. In these or other embodiments, the elastomers may have a number average molecular weight of at least 25 kg/mol, in other embodiments at least 50 kg/mol, in other embodiments at least 75 kg/mol, in other embodiments at least 100 kg/mol. In these or other embodiments, the molecular weight distribution of the elastomers (Mn/Mw) of less than 5.5, in other embodiments less than 4.5, in other embodiments less than 4.0, in other embodiments less than 3.5, in other embodiments less than 2.5, and in other embodiments less than 2.0. As is known in the art, Mn (number average molecular weight) and Mw (weight average molecular weight) may be determined by using gel permeation chromatography (GPC) calibrated with polystyrene standards and adjusted for the Mark-Houwink constants for the polymer in question.

In one or more embodiments, the polymers include homopolymers, and in other embodiments the copolymers, which refers to a polymer having two or more chemically distinct mer units. In one or more embodiments, the mer units of the polymer may be cis, trans, or vinyl.

In particular embodiments, the polymers include polydienes having a cis-1,4-linkage content that is greater than about 60%, in other embodiments greater than about 75%, in other embodiments greater than about 90%, and in other embodiments greater than about 95%. Also, these polymers may have a 1,2-linkage content (i.e. vinyl content) that is less than about 7%, in other embodiments less than 5%, in other embodiments less than 2%, and in other embodiments less than 1%. The cis-1,4- and 1,2-linkage contents can be determined by infrared spectroscopy. The number average molecular weight (Mn) of these polydienes may be from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The polydispersity of these polydienes may be from about 1.3 to about 5.0, and in other embodiments from about 2.0 to about 4.0. Exemplary high cis-polydienes include cis-1,4-polybutadiene, cis-1,4-polyisoprene, and cis-1,4-poly (butadiene-co-isoprene).

In one or more embodiments, the polymers include a medium or low cis polydiene (or polydiene copolymer) including those prepared by anionic polymerization techniques. These polydienes can have a cis content of from about 10% to about 70%, in other embodiments from about 15% to about 60%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In one or more embodiments, the synthetic elastomers may include functionalized elastomers. In one or more embodiments, functionalized elastomers include at least one functional group. In one or more embodiments, a functional group is group or substituent that is distinct from main portion of the polymer chain. In particular embodiments, the functional group includes a heteroatom. In certain embodiments, the functional group may be reactive or interactive with other polymer chains (propagating and/or non-propagating) or with other constituents that may be combined with the polymer such as reinforcing fillers (e.g., carbon black). In particular embodiments, functional groups include those groups attached to the polymer chain and reduce the 50° C. hysteresis loss of a carbon-black filled vulcanizate prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, the functionalized elastomers include a functional group located at the end of the polymer chain. In particular embodiments, the functional group may be located at the head of the polymer, which is the end of the polymer where initiation or polymerization of the polymer began. In other embodiments, the functional group may be located at the tail of the polymer, which is the end of the polymer where the polymerization thereof is terminated. In particular embodiments, the functionalized elastomer includes both head and tail functionalization; that is, the polymer includes at least one functional group located at the head of the polymer chain and at least one functional group located at the tail of the polymer chain.

Useful techniques for preparing functionalized elastomers are well known in the art. For example, these functional groups can be added to the polymer during synthesis of the elastomer or by grafting to the elastomer.

In one embodiment, the elastomers are synthesized by using anionic polymerization techniques. As is known in the art, an initiator including a functional group can be employed to produce polymers having a functional group located at the head of the polymer chain. For example, initiators that include cyclic amine groups, which impart a cyclic amine functionality to the resulting polymers. An example of these initiators includes lithio hexamethyleneimine, which is disclosed in U.S. Pat. Nos. 6,080,835; 5,786,441; 6,025,450; and 6,046,288, which are incorporated herein by reference. In another embodiment, the elastomers are synthesized by using anionic polymerization initiators that include at least one tin atom. These compounds, such as tin-lithium initiators, are believed to incorporate a tin atom at the head of the polymer chain. An example includes tributyltin lithium, which is disclosed in U.S. Pat. No. 5,268,439, which is incorporated herein by reference. In yet another embodiment, initiators that are dithioacetals can be employed to incorporate a heterocyclic group at the head of the polymer chain as disclosed in U.S. Pat. No. 7,153,919 and U.S. Publ. Nos. 2006/0264590, and 2006/0264589, which are incorporated herein by reference. Still others are disclosed in U.S. Pat. No. 7,335,712, which is incorporated herein by reference.

In yet another embodiment, anionically-polymerized elastomers, whether head-functionalized or not, are terminated with a coupling agent or a terminating agent that will impart an end functionality to the tail of the polymer. Useful compounds that may be used to couple or functionalize the tail end of the living polymers include, but are not limited to, those compounds that can be defined by the formula $R_nMX_{4-n}$, where R is an organic group, M is silicon or tin, X is a halogen atom, and n is a numeral from 0 to 3. Preferably, R is a simple alkyl group having from 1 to about 10 carbon atoms. Exemplary compounds include $SnCl_4$, $R_2SnCl_2$, and $RSnCl_3$, which are disclosed in U.S. Pat. No. 5,332,810, which is incorporated herein by reference. Other compounds that may be used alone or in conjunction with the foregoing tin or silicon compounds include metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides.

In still another embodiment, elastomers synthesized with coordination catalyst systems, such as lanthanide-based catalyst systems, are terminated with a coupling agent or terminating agent that will impart an end functionality to the polymer. Useful coupling or functionalizing agents include those described above, which are described in International Publication Nos. WO 2001/34658 and WO 2001/34659, which are incorporated herein by reference. In one or more embodiments, suitable functionalizing agents include those compounds that may contain groups such as ketone, aldehyde, amide, ester, imidazolidinone, isocyanate, and isothiocyanate groups. Examples of these compounds are disclosed in U.S. Publication Nos. 2006/0004131, 2006/0025539, 2006/0030677, and U.S. Pat. No. 7,294,680, which are incorporated herein by reference. Other examples of functionalizing agents include azine compounds as described in U.S. Publication No. 2007/0149717, hydrobenzamide compounds as disclosed in U.S. Publication No. 2007/0276122, nitro compounds as disclosed in U.S. Publication No. 2008/0051552, and protected oxime compounds as disclosed in U.S. Publication No. 2008/0146745, all of which are incorporated herein by reference. Still others are disclosed in U.S. Pat. Nos. 4,906,706, 4,990,573, 5,064,910, 5,567,784, and 5,844,050, 6,992,147, 6977,281; U.S. Publication No. 2006/0004131; Japanese Patent Application Nos. 05-051406A, 05-059103A, 10-306113A, and 11-035633A, which are incorporated herein by reference. Useful functionalizing agents that can be used to couple reactive polymer chains, which compounds may also be referred to as coupling agents, include any of those known in the art including, but not limited to, metal halides such as tin tetrachloride, metalloid halides such as silicon tetrachloride, ester carboxylate metal complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

In one or more embodiments, the polymers may be treated while in a cement. In one or more embodiments, the polymeric cement includes a solvent and the polymer. 'Polymeric cement' and 'polymer cement' are interchangeable for the purposes of the discussion herein. In preparing the polymer cements, the solvent may include aromatic solvent, heteroatom-containing solvent, non-aromatic non-heteroatom-containing solvent, or a mixture thereof. Aromatic and heteroatom-containing solvents include those described above. Examples of non-aromatic non-heteroatom-containing solvents include, but are not limited to, aliphatic and cycloaliphatic hydrocarbons. Some representative examples of these solvents include n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof. Some representative examples of suitable cycloaliphatic solvents include cyclopentane, cyclohexane, methylcyclopentane, methyl cyclohexane, and the like. Commercial mixtures of the above hydrocarbons, such as hexanes, may also be used.

The polymer cement may be prepared by using several techniques. In one embodiment, the cement is prepared by synthesizing elastomers within an organic solvent. In another embodiment, the cement is prepared by dissolving or suspending the elastomers within an organic solvent.

In one or more embodiments, the polymer cement may range in polymer concentration. In one or more embodiments, the polymer cement may include at least 10% by weight, in other embodiments at least 15% by weight, in other embodiments at least 20% by weight, and in other embodiments at least 25% by weight polymer based on the entire weight of the cement. In these or other embodiments, the polymer cement includes less than 60% by weight, in other embodiments less than 55% by weight, in other embodiments less than 50% by weight, in other embodiments less than 45% by weight, and in other embodiments less than 40% by weight polymer based on the entire weight of the cement.

In one or more embodiments, the polymer cement derives from a bulk polymerization system where the polymer is dissolved in the monomer (i.e. the monomer serves as the solvent).

Introduction of Polymer Reaction Product

In one or more embodiments, the combination or reaction product of (i) acetals or ketals of alditols and (ii)(a) a hydrocarbylated boric acid or (ii)(b) an organoaluminum compound is added directly to the polymer cement. In other embodiments, the reaction product is premixed with other compounds or solvents and then added to the polymer cement as a premix or cocktail. To this premix may be added other constituents such as oils and/or compatabilizers and or antioxidants.

In one or more embodiments, the premix is formed by introducing the reaction product with a solvent in which the reaction product is soluble. For example, the DBS-boronic acid reaction product may be introduced within and dissolved within THF to form a premix. To this premix may be added other constituents such as oils, antioxidants, and/or compatabilizers.

In one or more embodiments, the reaction product may be added to the polymer cement while the polymer cement in undergoing mixing or agitation, and this mixing or agitation may continue after introduction of the reaction product.

In one or more embodiments, the introduction of the reaction product with the polymer may take place under atmospheric pressure. In these or other embodiments, the introduction may take place while the cement is at a temperature of from about 30 to about 130° C., in other embodiments from about 40 to about 120° C., and in other embodiments from about 50 to about 100° C.. In one or more embodiments, the cement is maintained within these temperature ranges during the addition process, and optionally during mixing or agitation.

In one or more embodiments, the amount the hydrocarbylated boric acid reaction product (e.g. DBS-boronic acid) added to the polymer cement may be at least 0.5 parts by weight (pbw), in other embodiments at least 1.0 pbw, in other embodiments at least 1.5 pbw, and in other embodiments at least 2.0 pbw reaction product per 100 parts by weight of the polymer (phr). In these or other embodiments, the amount of the hydrocarbylated boric acid reaction product (e.g. DBS-boronic acid) added to the polymer cement may be less than 10 pbw, in other embodiments less than 5.0 pbw, in other embodiments less than 4.5 pbw, and in other embodiments less than 4.0 pbw reaction product phr.

In one or more embodiments, the amount of organoaluminum reaction product (e.g. DBS-organoaluminum complex) added to the polymer cement may be quantified based upon mmol of complex per 100 grams of polymer. In one or more embodiments at least 0.5 mmol, in other embodiments at least 1 mmol, in other embodiments at least 3 mmol, and in other embodiments at least 8 mmol complex is added to 100 grams of the polymer (phr). In these or other embodiments, less than 15 mmol, in other embodiments less than 12 mmol, and in other embodiments less than 10 mmol of complex is added to 100 grams of polymer.

In one or more embodiments, after introduction of the reaction product (e.g. DBS-boronic acid) to the cement, the polymer and at least a portion of the reaction product are isolated, or substantially isolated, from the solvent. In this respect, reference may be made to isolation of the solids from the cement.

In particular embodiments, water is employed to isolate the solids from the cement. In these or other embodiments, heat is employed to isolate the solids from the cement. In certain advantageous embodiments, steam desolventization is employed to isolate the solids from the cement.

In particular embodiments, the isolated product is further dried. Conventional procedures for drying may be employed. In one embodiment, the polymer may be isolated from the solvent by steam distillation of the solvent followed by filtration. Residual solvent may be removed by drying the rubber/processing aid masterbatch by using conventional drying techniques such as a drum dryer. Alternatively, the cement may be directly drum dried.

Use of Polymer

In one or more embodiments, the polymeric compositions produced according to the present invention may be employed to prepare vulcanizable compositions. In preparing the vulcanizable compositions of matter, the polymer may be combined with other ingredients such as fillers and like, which are well known in the art of rubber compounding.

The rubber compositions may include fillers such as inorganic and organic fillers. The organic fillers include carbon black. The inorganic fillers may include silica, aluminum hydroxide, magnesium hydroxide, clays (hydrated aluminum silicates), and mixtures thereof.

A multitude of rubber curing agents may be employed. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

Fillers are typically employed in an amount from about 1 to about 100 phr, and preferably from about 20 to about 90 phr, and more preferably from about 35 to about 80 phr, where phr refers to parts by weight ingredient per 100 parts by weight rubber within the compound, which may include the rubber within the premix as well as any additional rubber that may be added during compounding.

The vulcanizable rubber composition may be prepared by forming an initial masterbatch that includes the premix and filler. This initial masterbatch may be mixed at a starting temperature of from about 25° C. to about 100° C. with a discharge temperature of about 135° C. to about 180° C.. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in the in *The Compounding and Vulcanization of Rubber*, by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425; 5,719,207; 5,717,022; as well as EP 0890606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 170° C.. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Tire components of this invention preferably include tire treads. The rubber compositions, however, can also be used to form other elastomeric tire components such as subtreads, sidewalls, body ply skims, bead fillers and the like. Pneumatic tires can be made as discussed in U.S. Pat. Nos. 5,866,171; 5,876,527; 5,931,211; and 5,971,046, which are incorporated herein by reference.

The vulcanizable rubber compositions prepared according to this invention may also be employed in the manufacture of other rubber articles. For example, they may be employed in the manufacture of rubber air springs, which are vibration damping devices that are typically employed in trucks. They may also be employed in manufacture of rubber sheeting and other articles that are employed in preparing roofing materials. They may also be used in the manufacture of hoses.

In order to demonstrate the practice of the present invention, the following examples have been prepared and tested.

The examples should not, however, be viewed as limiting the scope of the invention. The claims will serve to define the invention.

EXAMPLES

Example 1

To a stirred solution of tetradecylmagnesium chloride (50 ml, 1M in THF) was added at −20° C. to THF (50 ml) followed by triethyl borate (10.2 ml, 60 mmol). The reaction mixture was stirred briefly at −20° C., and warmed up slowly over 3 hours to room temperature. Most of the solvent was removed on rotary evaporator and the concentrated mixture was poured into water (300 ml) and pH of the mixture was adjusted to about pH 4 using 12N hydrochloric acid. After being stirred for 10 hours, precipitated tetradecylboronic acid was isolated by filtration, washed three times with water and dried with air overnight. The dried white solid was washed with cold hexane to remove a trace of tetradecane and dried with air to yield 11.3 g (93%) of n-tetradecylboronic acid.

A mixture of n-tetradecylboronic acid (4.84 g, 20 mmol), dibenzylidene sorbitol (d-sorbitol Derivative)(7.17 g, 20 mmol) and toluene (100 ml) was refluxed for 3 hours with a simultaneous removal of water using Dean Stark trap. The warm reaction mixture was concentrated on rotary evaporator, followed by high vacuum to yield the desire product in near quantitative yield (11.17 g). The resulting product was believed to be a boronic acid ester (i.e. n-tetradecylboronic acid dibenzylidene sorbitol ester), which for purposes of this Examples section will be referred to as DBS borate.

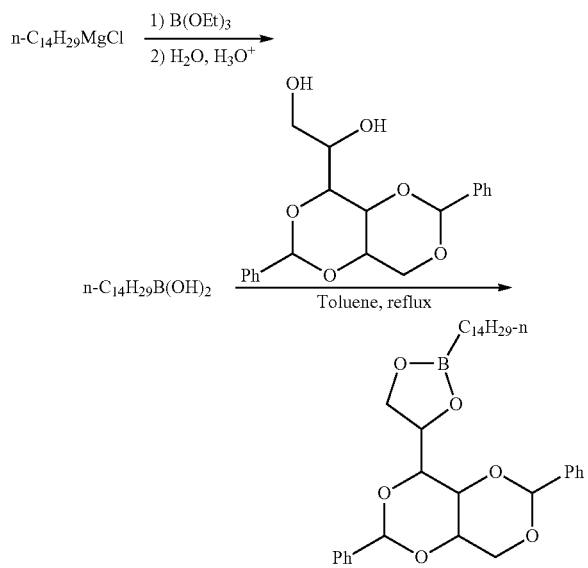

Styrene-butadiene polymer (SBR) and DBS borate (less than 6 weight percent) were dissolved in a mixture of THF and hexane to provide Sample 1, which included 3% be weight DBS borate based on the weight of the polymer. Once fully dissolved, the solution was desolventized using boiling water/steam to evaporate solvent from the polymer solution; a solid white polymeric material resulted. The polymer containing DBS borate and the products of its hydrolysis (DBS and boronic acid) were further dried by drum drying. The isolated/dried products were then tested for their cold flow resistance. Similar samples were prepared for comparison. Sample 2 included dibenzylidene sorbitol and was isolated/dried using steam followed by drum drying. Sample 3 similarly included dibenzylidene sorbitol but was isolated/dried by direct drum drying without steam. Sample 4, which contained no additive was isolated/dried using steam followed by drum drying. Sample 5, which likewise did not include additive, included an SBR polymer that was coupled with tin tetrachloride. The results of this testing along with specific isolation method employed for each sample are set forth in Table 1.

TABLE 1

| Sample | Additive | Isolation method | height (mm) @ 30 min |
|---|---|---|---|
| 1 | DBS borate | steam/water | 10.49 |
| 2 | DBS | steam/water | 7.25 |
| 3 | DBS | drum drying | 9.75 |
| 4 | none | steam/water | 6.95 |
| 5 | None (Coupled) | steam/water | 11.82 |

Cold flow measurements were obtained using a Scott Tester, which used a weight (5000 grams) to press cylindrical test specimens of the samples for 30 minutes, and then the polymer sample thickness was measured.

As seen from the data in Table 1, the addition of DBS borate of tetradecyl boronic acid to SBR polymer resulted in substantial improvement in cold flow; advantageously, the cold flow was comparable to the tin-coupled polymer of Sample 5. While Sample 3, which included dibenzylene sorbitol, gave advantageous cold flow results, the advantageous results were diminished upon exposure to water via steam desolventization.

The SBR polymer treated with DBS borate (Sample 1) was used in a rubber formulation of the type that may be used in the preparation of tire treads. The rubber formulation was prepared in a 65 g Banbury mixer operating at 60 RPM and 133° C. using the recipe set forth in Table 2 and a two-set mix procedure where an initial mix was prepared followed by a final, where curative was mixed. First, polymer was placed in the mixer, and after 0.5 minutes, the remaining ingredients except the stearic acid were added. The stearic acid was then added after 3 minutes. The initials (i.e. materbatches) were mixed for 5-6 minutes. At the end of mixing, the temperature was approximately 165° C.. The sample was transferred to a mill operating at a temperature of 60° C., where it was sheeted and subsequently cooled to room temperature. The finals were mixed by adding the initial materbatches and the curative materials to the mixer simultaneously. The initial mixer temperature was 65° C. and it was operating at 60 RPM. The final material was removed from the mixer after 2.25 minutes when the material temperature was between 100-105° C.. The finals were sheeted into Dynastat buttons and 6×6×0.075 inch sheets. The samples were cured at 171° C. for 15 minutes in standard molds placed in a hot press. A control rubber formulation (which simply included SBR without any cold flow additive) was similarly prepared.

TABLE 2

| Ingredient | Control | Experimental |
|---|---|---|
| Initial Mix | | |
| SBR + DBS borate | 0 | 100 |
| SBR | 100 | 0 |
| Carbon Black | 50 | 50 |

TABLE 2-continued

| Ingredient | Control | Experimental |
|---|---|---|
| Black Oil | 10 | 10 |
| Stearic Acid | 2 | 2 |
| Wax | 2 | 2 |
| Antioxidant | 0.95 | 0.95 |
| Final | | |
| Sulfur | 1.5 | 1.6 |
| Accelerators | 1.3 | 1.3 |
| Stearic Acid | 2 | 2 |
| Zinc Oxide | 2.5 | 2.5 |

The results of the testing are provided in Table 3.

TABLE 3

| | Control | Experimental |
|---|---|---|
| Mechanical Testing MDR2000 (171° C.) | | |
| ML (kg · cm): | 0.9 | 0.84 |
| MH (kg · cm): | 18.01 | 16.28 |
| MH − ML (kg * cm) | 17.11 | 15.44 |
| T50 (min): | 2.38 | 2.1 |
| t90 (min): | 7.46 | 11.87 |
| MOONEY/Scorch (130° C.) | | |
| Final, ML1 + 4: | 24.6 | 23.6 |
| TENSILE (23° C.) | | |
| 100% Modulus (MPa): | 2.28 | 2.03 |
| 300% Modulus (MPa): | 8.30 | 6.96 |
| Elongation (%): | 456 | 520 |
| Toughness (MPa): | 29.60 | 33.09 |
| TENSILE (100° C.) | | |
| 100% Modulus (MPa): | 1.842 | 1.51 |
| 300% Modulus (MPa): | 7.196 | 5.84 |
| Elongation (%): | 279 | 348 |
| Toughness (MPa): | 8.443 | 10.97 |

TABLE 3-continued

| | Control | Experimental |
|---|---|---|
| Rheological Testing | | |
| Tanδ @ 60° C. 2%, 10 Hz: | 0.2136 | 0.2297 |
| Tanδ @ 30° C. 2%, 10 Hz: | 0.2536 | 0.2688 |
| Tanδ @ 0° C. 2%, 10 Hz: | 0.4845 | 0.4701 |
| G' @ 60° C. 2%, 10 Hz: | 5.6256 | 5.3784 |
| G' @ 30° C. 2%, 10 Hz: | 7.7730 | 8.2153 |
| ΔG' (MPa) [0.25-14%], 10 Hz: | 3.526 | 3.3424 |

As can be seen in Table 3, the addition of DBS borate to SBR does not alter the rubber properties. The compound Mooney viscosities and cure rheometer data suggest similar processing between DBS borate containing and untreated polymers. While the T90 may be slightly longer for DBS borate containing rubber compounds, a slight curative adjustment could correct the long T90. Elongation at break and modulus data indicate that the DBS borate containing rubber is slightly less cured than the control, however, the rheological data indicate that wet traction, dry handling, and rolling resistance are equivalent to the control.

Example 2

Under an inert atmosphere, a 100 mL roundbottom flask was charged with dry dibenzylidene sorbitol (d-sorbitol Derivative) (5.0 mmol, 1.8 g) and a stir bar. While stirring the DBS powder at 0° C., a triisobutylaluminum (TIBA) solution (15 mmol, 0.68 M) in hexane was added dropwise to the powder. The mixture was stirred vigorously until gas evolution had ceased and the powder had completely dissolved into the hexane. The resulting product was believed to be a complex of the TIBA and the dibenzylidene sorbitol (TIBA-DBS).

The TIBA-DBS complex was then introduced to a styrene-butadiene (SBR) polymer as follows. Into a 1 liter flask containing polymer cement consisting of SBR (60 g, 108.2 kg/mol) dissolved in hexane at 15 wt %, freshly prepared TIBA-DBS complex (5.0 mmol) dissolved in hexane was injected. The solution was vigorously shaken to adequately mix the two solutions. Once mixed, the cement was transferred to an open container where the hexane solvent was allowed to evaporate over a period of several days. The polymer film was further dried by heating to 50° C. in vaccum.

Cold Flow Resistance of TIBA-DBS Containing SBR

Cold flow resistance studies were conducted on SBR and SBR treated with TIBA-DBS. Cold flow measurements were obtained using a Scott Tester, which used a weight (5000 grams) to press cylindrical test specimens of the samples for 30 minutes, and then the polymer sample thickness was measured. The results of the tests are provided in Table 4.

TABLE 4

| Polymer (SBR, Mn = 108.2 kg/mol, MWD = 1.03, Tg = 33° C.) | TIBA-DBS Complex (mmol) | Polymer Cement Solvent | Scott Tester (40 mm diameter), height (mm) at 25° C. and 30 min. | Gravitational Cold Flow initial height = 12.5 mm (mm, 7 bales) |
|---|---|---|---|---|
| Control | 0 | hexane | 5.3 | <0.01 |
| Inventive Sample | 5.0 | hexane | 6.4 | 8.13 |

As shown in Table 4, the SBR that contains TIBA-DBS was more resistant to compression when compared to the control SBR. Likewise, a gravitational cold flow experiment was performed where each polymer sample was compressed by a weight equal to a stack of seven bales of polymer. Similar to the Scott tester experiment, the inventive sample containing TIBA-DBS was more resistant toward the compression than the control. This resistance to compression indicates that SBR treated with TIBA-DBS has improved cold flow resistance.

Various modifications and alterations that do not depart from the scope and spirit of this invention will become apparent to those skilled in the art. This invention is not to be duly limited to the illustrative embodiments set forth herein.

What is claimed is:

1. A polymeric composition of matter comprising:
   a polymer; and
   the combination or reaction product of (i) an acetal or ketal of an alditol and (ii) (a) a hydrocarbylated boric acid, (b)

an organoaluminum compound, or (c) both a hydrocarbylated boric acid and an organoaluminum compound.

2. The composition of claim 1, where the polymer includes a polydiene or a polydiene copolymer.

3. The composition of claim 2, where the polydiene or the polydiene copolymer is selected from the group consisting of polybutadiene, polyisoprene, poly(styrene-co-butadiene), poly(styrene-co-butadiene-co-isoprene), poly(isoprene-co-styrene), and poly(butadiene-co-isoprene).

4. The composition of claim 3, where the polybutadiene is a medium-cis polybutadiene or a high-cis polybutadiene.

5. The composition of claim 1, where the polymer, prior to combination with the combination or reaction product, is characterized by a cold flow, under standard gravitational cold flow analysis, giving rise to a reduction in cylinder height from 13 mm to less than 12 mm.

6. The composition of claim 1, where the hydrocarbylated boric acid is boronic acid.

7. The composition of claim 1, where the hydrocarbylated boric acid is borinic acid.

8. The composition of claim 1, where the acetal or ketal of an alditol is a sorbitol or a xylitol.

9. The composition of claim 1, where the acetal or ketal of an alditol is dibenzylidene sorbitol.

10. The composition of claim 1, where the acetal or ketal of an alditol is selected from the group consisting of dimethylidene sorbitol, dibenzylidene sorbitol (DBS), di(alkylbenzylidene) sorbitols, 1,3-O-2,4-bis(3,4-dimethylbenzylidene) sorbitol, 1,3,2,4-bis(4-ethylbenzylidene)-1-allyl-sorbitol, 1,3,2,4-bis(3'-methyl-4'-fluoro-benzylidene)-1-propyl-sorbitol, 1,3,2,4-bis (5',6',7',8'-tetrahydro-2-naphthaldehyde-benzylidene)-1-allyl-xylitol, bis-1,3,2-4-(3',4'-dimethylbenzylidene)-1"-methyl-2"-propyl-sorbitol, and 1,3,2,4-bis(3', 4'-dimethylbenzylidene)-1-propyl-xylitol.

11. The composition of claim 1, where the organoaluminum compound is represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

12. The composition of claim 1, where the organoaluminum compound is selected from the group consisting of trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide, or where the organoaluminum compound is a trihydrocarbyl aluminum selected from the group consisting of trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris (1-methylcyclopentyl)aluminum, triphenylaluminum, tri-p-tolylaluminum, tris (2, 6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

13. The composition of claim 1, where the organoaluminum compound is an aluminoxane.

14. A polymeric composition of matter comprising:
a polydiene or polydiene copolymer; and
hydrocarbyl boronic acid ester defined by the formula

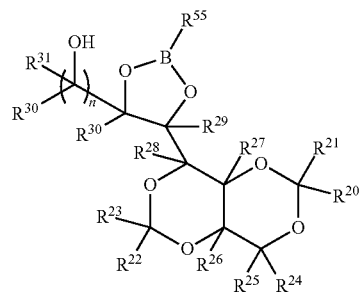

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2, and $R^{55}$ is a hydrocarbyl group, or a hydrocarbyl borinic acid ester defined by one of the formulae

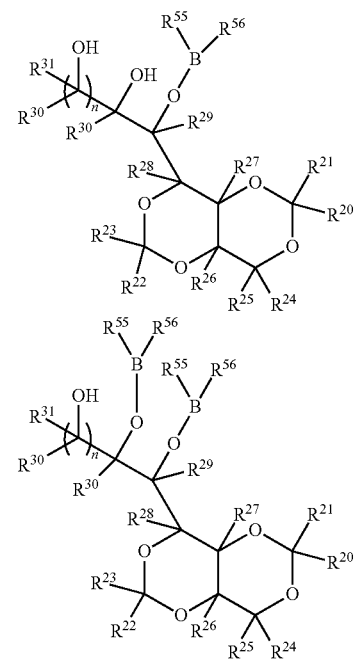

where $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ are each independently a hydrogen atom or a monovalent organic group, or where $R^{20}$ and $R^{21}$ and/or $R^{22}$ and $R^{23}$ join to form a divalent organic group, and where n is 0, 1, or 2, and $R^{55}$ $R^{56}$ are each independently a hydrocarbyl group.

15. The composition of claim 14, where $R^{20}$ and $R^{22}$ are aromatic groups.

16. A polymeric composition of matter including:
polymer, solvent, and the combination or reaction product of (i) an acetal or ketal of an alditol and (ii) (a) a hydrocarbylated boric acid, (b) an organoaluminum compound, or (c) both a hydrocarbylated boric acid and an organoaluminum compound.

17. The composition of claim 16, where the solvent is selected from the group consisting of n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof.

18. A method for reducing the cold flow of a polymeric composition of matter, the method comprising:

introducing polymer with the combination or reaction product of (i) an acetal or ketal of an alditol and (ii) (a) a hydrocarbylated boric acid, (b) an organoaluminum compound, or (c) both a hydrocarbylated boric acid and an organoaluminum compound.

19. The method of claim 18, further comprising the step of isolating the polymer and the combination or reaction product of (i) an acetal or ketal of an alditol and (ii) (a) a hydrocarbylated boric acid, (b) an organoaluminum compound, or (c) both a hydrocarbylated boric acid and an organoaluminum compound, and where said step of isolating includes removing a solvent by employing water in the form of steam, and where said step of introducing polymer includes introducing at least 0.2 and less than 5 moles of hydrocarbylated boric acid or organoaluminum compound per mole of the acetal or ketal of alditol.

20. A tire including a tire component prepared with the composition of matter according to claim 1.

21. The composition of claim 2, where the polydiene or polydiene copolymer has a cis-1,4-linkage content that is greater than 90%.

22. The composition of claim 2, where the polydiene or polydiene copolymer has a cis-1,4-linkage content of from about 10% to about 70%, and a 1,2-linkage content of from about 10% to about 60%, with the balance including trans-1,4-linkage content.

23. The composition of claim 22, where the polydiene or polydiene copolymer exhibits cold flow prior to the combination with the combination or reaction product of (i) an acetal or ketal of an alditol and (ii) (a) a hydrocarbylated boric acid, (b) an organoaluminum compound, or (c) both a hydrocarbylated boric acid and an organoaluminum compound, and where the cold flow is quantified by a change from 13 mm to less than 7 mm in the height of a cylindrical sample after standard cold flow analysis.

24. The composition of claim 23, where the polydiene or polydiene copolymer has a glass transition temperature of less than 0° C.

25. The method of claim 18, where said step of introducing includes adding the combination or reaction product of (i) an acetal or ketal of an alditol and (ii) (a) a hydrocarbylated boric acid, (b) an organoaluminum compound, or (c) both a hydrocarbylated boric acid and an organoaluminum compound to a cement including the polymer dissolved in a solvent, where the cement includes at least 10% by weight polymer.

26. The method of claim 25, where said step of introducing includes adding a cocktail to the polymer cement, where the cocktail includes the combination or reaction product of (i) an acetal or ketal of an alditol and (ii) (a) a hydrocarbylated boric acid, (b) an organoaluminum compound, or (c) both a hydrocarbylated boric acid and an organoaluminum compound dissolved within a solvent.

27. The composition of claim 1, where the composition includes the polymer and the combination or reaction product of (i) an acetal or ketal of an alditol and (ii) a hydrocarbylated boric acid.

28. The composition of claim 1, where the composition includes the polymer and the combination or reaction product of (i) an acetal or ketal of an alditol and (ii) an organoaluminum compound.

* * * * *